(12) United States Patent
Egorenkov et al.

(10) Patent No.: US 11,615,071 B2
(45) Date of Patent: Mar. 28, 2023

(54) METHODS AND SYSTEMS FOR DATA SYNCHRONIZATION

(71) Applicant: Palantir Technologies Inc., Palo Alto, CA (US)

(72) Inventors: Alexander Egorenkov, New York, NY (US); Feridun Arda Kara, Palo Alto, CA (US); Julien Levy, London (GB); Jason Marmon, New York, NY (US); Kamran Khan, New York, NY (US); Natacha Gabbamonte, Brooklyn, NY (US); Sander Kromwijk, Brooklyn, NY (US); Xinyi Wang, New York, NY (US); Yixun Xu, Jersey City, NJ (US)

(73) Assignee: Palantir Technologies Inc., Denver, CO (US)

( * ) Notice: Subject to any disclaimer, the term of this patent is extended or adjusted under 35 U.S.C. 154(b) by 103 days.

(21) Appl. No.: 16/875,304

(22) Filed: May 15, 2020

(65) Prior Publication Data

US 2021/0124729 A1    Apr. 29, 2021

Related U.S. Application Data

(60) Provisional application No. 62/925,715, filed on Oct. 24, 2019.

(51) Int. Cl.
*G06F 16/23* (2019.01)

(52) U.S. Cl.
CPC ................................ *G06F 16/2365* (2019.01)

(58) Field of Classification Search
None
See application file for complete search history.

(56) References Cited

U.S. PATENT DOCUMENTS

| | | | |
|---|---|---|---|
| 7,225,189 B1 * | 5/2007 | McCormack | G06F 40/18 |
| 10,802,746 B1 * | 10/2020 | Lazier | G06F 3/0604 |
| 11,126,658 B1 * | 9/2021 | Niewiadomski | G06F 16/219 |
| 2004/0068724 A1 * | 4/2004 | Gardner, III | G06F 8/65 |
| | | | 707/999.203 |

(Continued)

OTHER PUBLICATIONS

Extended European Search Report for EP Application No. 20203739.6 dated Mar. 19, 2021, 7 pages.

*Primary Examiner* — Irene Baker
(74) *Attorney, Agent, or Firm* — Sheppard Mullin Richter & Hampton LLP

(57) ABSTRACT

Methods, systems, and apparatus, including computer programs encoded on computer storage media for data synchronization are provided. One of the methods includes: receiving, from a client device displaying a spreadsheet interface, a query for data; identifying, from one or more datasets in a data store, a plurality of data items responsive to the query; sending, to the client device, a plurality of data entries for display in a plurality of cells of the spreadsheet interface, wherein the data entries correspond to the identified data items; receiving, from the client device, information associated with one or more changes to one or more of the data entries, wherein the one or more changes are created based on one or more user inputs in the spreadsheet interface; and updating, in the data store based on the one or more changes, one or more of the data items corresponding to the one or more changed data entries.

14 Claims, 12 Drawing Sheets

(56) References Cited

U.S. PATENT DOCUMENTS

| | | | |
|---|---|---|---|
| 2007/0067359 A1* | 3/2007 | Barrs | G06F 8/71 |
| | | | 707/999.203 |
| 2009/0282125 A1* | 11/2009 | Jeide | H04L 67/1095 |
| | | | 709/217 |
| 2011/0185305 A1 | 7/2011 | Lai et al. | |
| 2014/0281872 A1* | 9/2014 | Glover | G06F 40/197 |
| | | | 715/229 |
| 2014/0310697 A1* | 10/2014 | Reddish | G06F 9/451 |
| | | | 717/154 |
| 2016/0253397 A1* | 9/2016 | Frye | G06F 16/93 |
| | | | 707/624 |
| 2017/0315979 A1* | 11/2017 | Boucher | G06F 40/197 |
| 2018/0024701 A1* | 1/2018 | Sanches | G06F 16/178 |
| | | | 715/781 |
| 2018/0189369 A1 | 7/2018 | Baek et al. | |
| 2020/0117705 A1* | 4/2020 | Hance | G06F 16/152 |

* cited by examiner

Example

···>Examples >Work In Progress ☆ | Edit | View | Insert | Table | Data | Document ⟳ All indexed datasets  ⇌ Index new dataset | Datasets in use  ⊞ Sources (1)  ◯ Auto-update  | Dataset outputs |  ⊟ Sync to dataset

| | A | B | C | D | E | F | G | H | I |
|---|---|---|---|---|---|---|---|---|---|
| 1 | | | | | | | | | |
| 2 | | Name ▽ | Date ▽ | Title ▽ | Docket ▽ | Message function ▽ | comments ▽ | ⊟ Find and use data | |
| 3 | | City 1 | Apr. 01, 2017 | Issue 1 | 32453 | Message 1 | comment 1 | | |
| 4 | | City 2 | Apr. 04, 2017 | Issue 2 | 25235 | Message 2 | comment 2 | | |
| 5 | | City 2 | Apr. 04, 2017 | Issue 3 | 16156 | Message 3 | comment 3 | | |
| 6 | | City 3 | Apr. 06, 2017 | Issue 4 | 61665 | Message 4 | comment 4 | | |
| 7 | | City 3 | Apr. 06, 2017 | Issue 5 | 45496 | Message 5 | comment 5 | | |
| 8 | | City 3 | Apr. 06, 2017 | Issue 6 | 55263 | Message 6 | comment 6 | | |
| 9 | | City 4 | Apr. 15, 2017 | Issue 7 | 61666 | Message 7 | comment 7 | | |
| 10 | | City 5 | Apr. 21, 2017 | Issue 8 | 56198 | Message 8 | comment 8 | | |
| 11 | | City 6 | Apr. 21, 2017 | Issue 9 | 79856 | Message 9 | comment 9 | | |
| 12 | | City 6 | Apr. 21, 2017 | Issue 10 | 45669 | Message 10 | comment 10 | | |
| 13 | | City 6 | Apr. 21, 2017 | | 89256 | Message 11 | comment 11 | | |
| 14 | | City 6 | Apr. 21, 2017 | Issue 9 | 45633 | Message 12 | comment 12 | | |
| 15 | | | | | | | | | |
| 16 | | | | | | | | | |
| 17 | | | | | | | | | |
| 18 | | | | | | | | | |

Example ▽

∞∘›Examples ›Work In Progress ☆ | Edit | View | Insert | Table | Data | Document

| Datasets available | All indexed datasets | Index new dataset | Datasets in use | ⊞ Sources (1) | ○ Auto-update | Dataset outputs | | Sync to dataset |

530 ⟶

517 ⟶

516 ⟶

| fx | | | | | | | | |
|---|---|---|---|---|---|---|---|---|
| | A | B | C | D | E | | H | I |
| 1 | | | | | | | ⊞ Find and use data | |
| 2 | | Name ▽ | Date ▽ | Title ▽ | Docket ▽ | | 532 | |
| 3 | | City 1 | Apr. 01, 2017 | Issue 1 | 32453 | SYNC TO DATASET ✕ | | |
| 4 | | City 2 | Apr. 04, 2017 | Issue 2 | 25235 | Dataset /User/username/Example dataset. | | |
| 5 | | City 2 | Apr. 04, 2017 | Issue 3 | 16156 | [Rename...] [Move...] [Change...] [Stop syncing] | 533 | |
| 6 | | City 3 | Apr. 06, 2017 | Issue 4 | 61665 | Branch name | | |
| 7 | | City 3 | Apr. 06, 2017 | Issue 4 | 45496 | [master] | 531 | |
| 8 | | City 3 | Apr. 06, 2017 | Issue 5 | 55263 | Edit to export to a new branch | | |
| 9 | | City 4 | Apr. 15, 2017 | Issue 6 | 61666 | Export column type | | |
| 10 | | City 5 | Apr. 21, 2017 | Issue 7 | 56198 | Name | [Auto ⊛] | |
| 11 | | City 6 | Apr. 21, 2017 | Issue 8 | 79856 | Date | [Auto ⊛] | |
| 12 | | City 6 | Apr. 21, 2017 | Issue 9 | 45669 | Title | [Auto ⊛] | |
| 13 | | City 6 | Apr. 21, 2017 | Issue 10 | 89256 | Docket | [Auto ⊛] | |
| 14 | | City 6 | Apr. 21, 2017 | Issue 9 | 45633 | Message function | | |
| 15 | | | | | | Comments | | |
| 16 | | | | | | | 534 | |
| 17 | | | | | | | | |
| 18 | | | | | | | | |

FIG. 5C

Editor (copied 2019-7-18 at 09:0..

- Find and use data
- Submit changes — 543
- ○ Reset document — 544

| Name | Date | Title | Docket | Message function | comments | Has_changed |
|---|---|---|---|---|---|---|
| City 1 | Apr. 01, 2017 | Issue 1 | 32453 | Message 1 | comment 1 | false |
| City 2 | Apr. 04, 2017 | Issue 2 | 25235 | Message 2 | comment 2 | false |
| City 2 | Apr. 04, 2017 | Issue 3 | 16156 | Message 3 | comment 3 | false |
| City 3 | Apr. 06, 2017 | Issue 4 | 61665 | Message 4 | comment 4 | false |
| City 3 | Apr. 06, 2017 | Issue 4 | 45496 | Message 5 | comment 5 | true |
| City 3 | Apr. 06, 2017 | Issue 5 | 55263 | Message 6 | comment 6 | false |
| City 4 | Apr. 15, 2017 | Issue 6 | 61666 | Message 7 | comment 7 | false |
| City 5 | Apr. 21, 2017 | Issue 7 | 56198 | Message 8 | comment 8 | false |
| City 6 | Apr. 21, 2017 | Issue 8 | 79856 | Message 9 | comment 9 | false |
| City 6 | Apr. 21, 2017 | Issue 9 | 45669 | Message 10 | comment 10 | false |
| City 6 | Apr. 21, 2017 | Issue 10 | 89256 | Message 11 | comment 11 | false |
| City 6 | Apr. 21, 2017 | Issue 9 | 45633 | Message 12 | comment 12 | false |

METHODS AND SYSTEMS FOR DATA SYNCHRONIZATION

CROSS-REFERENCE TO RELATED APPLICATION

This application claims the benefit of U.S. Application No. 62/925,715, filed Oct. 24, 2019, the content of which is incorporated herein by reference in its entirety.

FIELD OF THE DISCLOSURE

This disclosure relates generally to data processing and, more particularly, to improved methods of synchronizing data between a graphical user interface and a data store.

BACKGROUND

Enterprise-level data-management systems ordinarily manage large amounts of data distributed in various datasets. Data in the different datasets may interrelate with each other through complex structures. Applications for data processing may display data in graphical user interfaces (e.g., spreadsheets) and execute operations on the data based on user inputs. Under conventional approaches, applications for data processing may not be designed to work on top of a complex data-management system and to handle complex data relationships. As an example, conventional applications may not be capable of flexibly retrieving data from multiple different datasets and aggregating the data for display in one graphical user interface. Display and manipulation of data from different datasets in one graphical user interface may be required for effective performance of various business functions. As another example, importation of data into and exportation of data from conventional applications may be daunting. The data in the applications may be out of date after changes are made to data in an underlying data-management system. Data operations by a user using the applications may not be reflected in the underlying data-management system in a timely manner. Synchronization between the applications and the underlying datasets may require complicated user actions to achieve. It can be appreciated that there is a need for an improved data-management system that enables flexible exchange of data between various graphical user interfaces and various datasets, smooth synchronization of data modifications, as well as version and dependency management. Various embodiments disclosed herein fulfill this need and provides further related advantages.

SUMMARY

Various embodiments of the present disclosure can include systems, methods, and non-transitory computer readable media configured to provide a data-synchronization solution that enables flexible exchange of data between various graphical user interfaces and various datasets, smooth synchronization of data modifications, as well as version and dependency management. In some embodiments, a data-processing application (e.g., an enhanced spreadsheet application) may be integrated with a data-management system. The data-management system may enable a user to load data from one or more data stores associated with the data-management system to the data-processing application using a data query. In some embodiments, the user may perform various operations on the data entries in the graphical user interface, such as modifying one or more data entries or creating one or more new data entries based on the existing data entries. The cells containing the data entries may be linked to corresponding data items stored in the data stores, such that changes to the values in the cells by a user automatically cause updates to the data items in the databases. In some embodiments, data changes in the underlying data stores may be reflected in the data-processing application. The data-processing application may continuously monitor data items of interest stored in the underlying data management system and update values in appropriate cells of the graphical user interface when changes to the underlying data items are detected.

For example, in one embodiment, the methods, systems, and non-transitory computer readable media can be configured to execute operations including receiving, from a client device displaying a spreadsheet interface, a query for data; identifying, from one or more datasets in a data store, a plurality of data items responsive to the query; sending, to the client device, a plurality of data entries for display in a plurality of cells of the spreadsheet interface, wherein the data entries correspond to the identified data items; receiving, from the client device, information associated with one or more changes to one or more of the data entries, wherein the one or more changes are created based on one or more user inputs in the spreadsheet interface; and updating, in the data store based on the one or more changes, one or more of the data items corresponding to the one or more changed data entries.

In some embodiments, the query comprises one or more keywords; one or more object types; one or more filters; one or more property types; or one or more sorting criteria. In some embodiments, the plurality of data items comprise information associated with a plurality of objects, the information for each of the objects comprising: one or more object identifiers; one or more object properties; or one or more related objects. In some embodiments, the updating one or more of the data items corresponding to the one or more changed data entries comprises: storing the information associated with the one or more changes to the one or more of the data entries; receiving a user input confirming the one or more changes; and updating the one or more of the data items in response to the user input confirming the one or more changes.

In some embodiments, the operations further comprise: receiving, from the client device, a request to export data entries in the cells to the data store; generating a data set comprising a plurality of data items corresponding to the data entries in the cells; and storing the generated dataset in the data store.

In some embodiments, the operations further comprise: monitoring the identified data items in the data store; detecting one or more changes to one or more of the identified data items; and updating one or more of the data entries in the spreadsheet interface that correspond to the one or more changed data items based on the detected one or more changes. In some embodiments, the detecting one or more changes to one or more of the identified data items comprises: retrieving, from a version index associated with the identified data items, a first version identifier associated with the identified data items in the data store; determining a second version identifier associated with the data entries in the spreadsheet interface; and determining that the second version identifier is different from the first version identifier.

In some embodiments, the operations further comprise: detecting a triggering event associated with the spreadsheet interface; identifying one or more different data entries in the spreadsheet interface that depend on the one or more of the data entries corresponding to the one or more changed data items; and updating, in response to the detecting the triggering event, the one or more different data entries based on the detected one or more changes. In some embodiment, the identifying one or more different data entries in the spreadsheet interface that depend on the one or more of the data entries comprise: accessing a dependency graph comprising a plurality of data entries and a plurality of dependency relationships among the data entries; identifying, in the dependency graph, one or more dependency relationships associated with the one or more of the data entries; and identifying the one or more different data entries based on the one or more dependency relationships. In some embodiments, the triggering event comprises: display of the spreadsheet interface on the client device; or a user input for refreshing the spreadsheet interface.

Each feature or concept outlined above is independent and can be combined with other features or concepts outlined above or with any other feature or concept disclosed in this application. Other features and advantages of the disclosure should become apparent from the following description of the preferred embodiments, taken in conjunction with the accompanying drawings, which illustrate, by way of example, the principles of the disclosure.

BRIEF DESCRIPTION OF THE DRAWINGS

FIGS. 5A-5E illustrate a plurality of example graphical user interfaces each comprising one or more spreadsheets in accordance with some embodiments.

DETAILED DESCRIPTION

Figure 1:
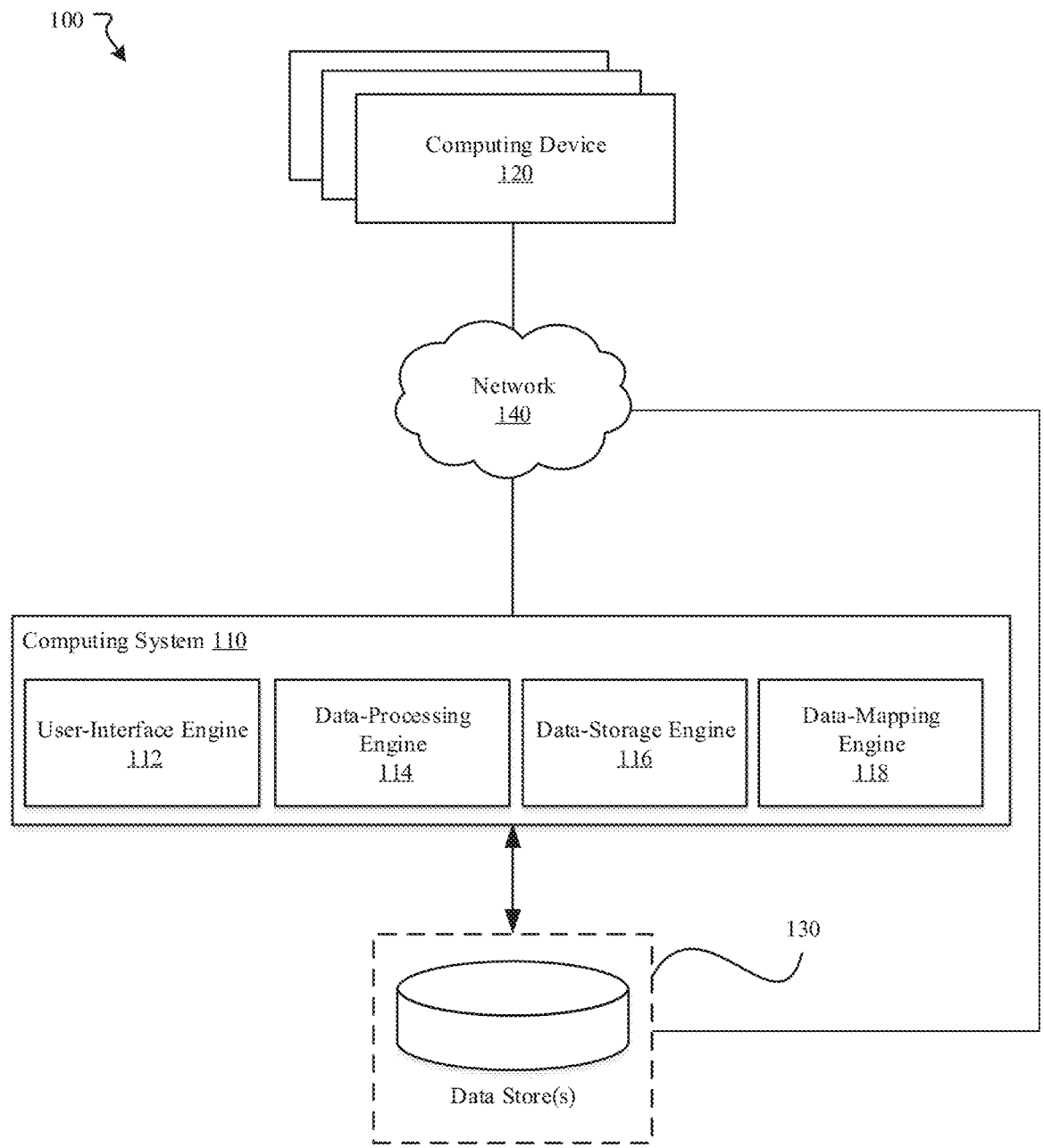
FIG. 1 illustrates an example network environment for synchronizing data between a graphical user interface and a data store in accordance with some embodiments.

An improved approach rooted in computer technology overcomes the previously discussed problems and other difficulties associated with conventional approaches. Based on computer technology, embodiments disclosed herein can provide a data-synchronization solution that enables flexible exchange of data between various graphical user interfaces and various datasets, smooth synchronization of data modifications, as well as version and dependency management. In some embodiments, a data-processing application (e.g., an enhanced spreadsheet application) may be integrated with a data-management system. The data-processing application may provide various tools for users to perform data operations. In some embodiments, a user may load data from one or more data stores associated with the data-management system to the data-processing application using a data query. Data items from various different datasets that are responsive to the query may be retrieved and presented in a field or a plurality of cells of a graphical user interface (e.g., a spreadsheet) provided by the data-processing application. In some embodiments, the data may be organized as objects that include one or more identifiers and properties.

In some embodiments, the user may perform various operations on the data entries in the graphical user interface, such as modifying one or more data entries or creating one or more new data entries based on the existing data entries. The cells containing the data entries may be linked to corresponding data items stored in the data stores, such that changes to the values in the cells by a user automatically cause updates to the data items in the databases. In some embodiments, the data-processing application may provide an interface that is not automatically synchronized to the underlying datasets, but rather provides a two-step data modification process. The user may modify data within such an interface without changing the underlying data. Only after the user confirms or commits the changes will the data changes be transmitted to a data structure synchronized to the underlying database. In some embodiments, the user may also export the data entries in the field as a new data set stored in the data stores. In some embodiments, the cells in the graphical user interface may be linked and synchronized to other data structures, such as a form.

In some embodiments, data changes in the underlying data stores may be reflected in the data-processing application. The data-processing application may continuously monitor data items of interest stored in the underlying data management system and update values in appropriate cells of the graphical user interface when changes to the underlying data items are detected. In some embodiments, the data-management system may maintain a version index for data items stored therein. The changes to data may be detected by comparing a version of the data in a graphical user interface with the newest version of the data in the version index. In some embodiments, the data-processing application may also maintain a dependency graph for data entries therein. When certain data entries are changed, all data entries depending on the data entries may also be changed. The data-processing application may push the changes to all the dependent data entries. In some embodiments, the data-processing application may delay calculations necessary for updating the dependent data entries until, for example, a user accesses the dependent data entries in order to conserve computational resources. Particular embodiments provide a graphical user interface seamlessly integrated with an underlying data-management system and allow a user to flexibly visualize and manipulate data maintained in complex structures.

FIG. 1 illustrates an example network environment 100 for synchronizing data between a graphical user interface and a data store in accordance with some embodiments. In some embodiments, the network environment 100 may comprise a computing system 110, one or more computing devices 120 communicating with the computing system 110 via a network 140, and one or more data stores 130 coupled to the computing system 110. In some embodiments, the computing system 110 may comprise one or more servers that individually or collectively operate one or more network applications. The computing system 110 may have access to the one or more data stores 130 via one or more local or remote connections. For example, the computing system 110 may be configured to read data from the one or more data stores 130 and write data to the one or more data stores 130.

The network applications may be operated based on data stored in the one or more data stores 130. In some embodiments, the computing system 110 may make the network applications available to the computing devices 120 via the network 140. The computing devices 120 may correspond to one or more client-side entities. The computing devices 120 may provide one or more client-side interfaces corresponding to the network applications provided by the computing system 110. The computing devices 120 may receive inputs from users and may provide one or more graphical user interfaces for display to the users. For example, via a spreadsheet application provided by the computing system 110, a computing device 120 may provide a spreadsheet interface for display to a user.

In some embodiments, the computing system 110 may provide a data-management platform to a plurality of users. Via one or more network applications provided by the computing system 110, a user may be allowed to access data stored in the data stores 130, load selected data to a computer device 120, perform various transformations or operations on the data, store data in the data stores 130, or perform other suitable tasks with respect to the data. The data-management platform provided by the computing system 110 may comprise various structural or functional engines to provide the services to the users. Each engine may be implemented on corresponding hardware or software that may be shared with or independent from those of other engines. The engines may comprise a user-interface engine 112, a data-processing engine 114, a data-storage engine 116, a data-mapping engine 118, other suitable components, or any combination thereof.

In some embodiments, the user-interface engine 112 may be configured to provide one or more user interfaces associated with the data-management platform associated with the computing system 110. The user interfaces may be rendered and provided as graphical user interfaces for display on the computing devices 120. For example, one or more graphical user interfaces provided by the user-interface engine may each comprise one or more spreadsheets. Such graphical user interfaces may be referred to as spreadsheet interfaces herein. Data items from a relational dataset stored in one or more of the data stores 130 may be displayed in various cells that are located in various rows and columns in the spreadsheet. Relationships among the data items may be shown by the respective locations of the cells that contain the data items in the spreadsheet. A collection of cells may be referred to herein as a field in the spreadsheet interface. A spreadsheet may also display one or more data objects. A data object may comprise one or more identifiers and properties. Information associated with each data object may be displayed in a particular row or column in the spreadsheet. Related data objects may be displayed in proximity to the data object in the spreadsheet interface. Further details about the graphical user interfaces provided by the user-interface engine 112 are provided with respect to FIGS. 5A-5E.

In some embodiments, the data-processing engine 114 may be configured to perform one or more data-processing operations associated with data in one or more of the data stores 130. The data-processing operations may comprise transformations on the data including, for example, searching, filtering, clustering, sorting, applying a mathematical formula on one or more data items, data creation, data deletion, other suitable data transformations, or any combination thereof. The data-processing engine 114 may be configured to obtain one or more user inputs from the computing devices 120, parse or interpret the user inputs, identify data indicated in the user inputs, identify data transformations encoded in the user inputs, perform the data transformations on the data based on the user inputs, perform other suitable functionalities, or any combination thereof.

In some embodiments, the data-storage engine 116 may be configured to control storage of data in one or more of the data stores 130. Specifically, the data-storage engine 116 may be configured to keep track of locations of different data items stored in the data stores 130, to store data in appropriate locations of the data stores 130, to retrieve data from appropriate locations of the data stores 130, to maintain data structures representing relationships among different data items, to maintain a permission system for protecting the security of data items and controlling user access to the data, to perform other suitable operations, or any combination thereof. The data-storage engine 116 may receive requests or instructions from one or more other components of the computing system 110 (e.g., the user-interface engine 112, the data-processing engine 114) and perform operations on data stored in the data stored 130 according to the requests or instructions.

In some embodiments, the data-mapping engine 118 may be configured to control data synchronization between one or more user interfaces provided by the computing system 110 and one or more of the data stores 130. As an example, after loading data from one or more of the data stores 130 into a graphical user interface, a user may make one or more changes to the data in the graphical user interface. The data-mapping engine 118 may trigger one or more data updates in the one or more data stores 130 based on the changes entered in the graphical user interface. As another example, when one or more data items in the data stores 130 is changed, the data-mapping engine 118 may update one or more graphical user interfaces displaying the changed data items to reflect the up-to-date values. Further details concerning the data-mapping engine 118 are described with respect to FIG. 2.

Figure 2:
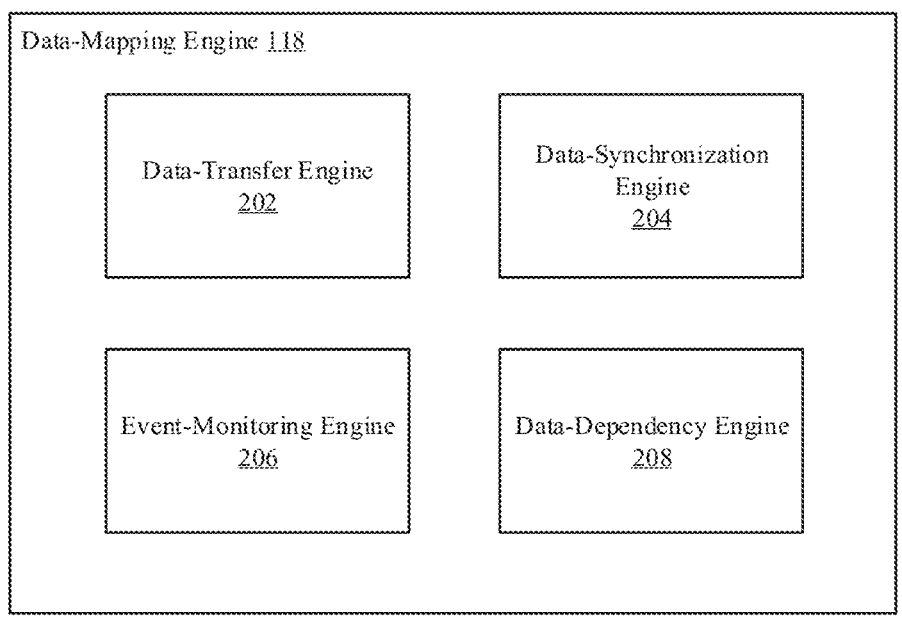
FIG. 2 illustrates an example data-mapping engine in accordance with some embodiments.

FIG. 2 illustrates an example data-mapping engine 118 in accordance with some embodiments. In some embodiments, the data-mapping engine 118 may comprise one or more structural or functional sub-components. Each sub-component may be implemented on corresponding hardware or software that may be shared with or independent from those of other sub-components. The data-mapping engine 118 may comprise a data-transfer engine 202, data-synchronization engine 204, an event-monitoring engine 206, a data-dependency engine 208, other suitable sub-components, or any combination thereof.

In some embodiments, the data-transfer engine 202 may be configured to manage data transfer among the computing system 110, one or more computing devices 120, and one or more data stores 130. As an example, in response to a request from a computing device 120 to import data, the data-transfer engine 202 may obtain the requested data from one or more of the data stores 130, provide the data to one or more network applications operating at the computing system 110, which may then provide the data for display at the computing device 120. As another example, in response to a request from a computing device 120 to export data generated via user inputs in a graphical user interface, the data-transfer engine 202 may generate a dataset corresponding to the data and store the dataset in one or more of the data stores 130.

In some embodiments, the data-synchronization engine 204 may be configured to synchronize data between one or more user interfaces provided by the data-management platform and backend data stored in one or more of the data stores 130. For example, the data-synchronization engine 204 may keep mapping relationships between one or more data entries in a graphical user interface displayed on a computing device 120 and one or more data items in a data store 130. When a data entry changes in the graphical user interface, the data-synchronization engine may automatically update the corresponding data item in the data store 130. Similarly, when a data item changes in the data store 130, the data-synchronization engine may update the corresponding data entry in the graphical user interface to reflect the up-to-date value of the data item. In order to detect changes to data entries in the graphical user interface or changes to data items in the data store 130, the data-synchronization engine 204 may maintain one or more version indexes or other suitable data structures for storing version information associated with data. Each version index may comprise version information associated with a plurality of data entries or data items. As an example, the data-synchronization engine 204 may update the version index each time data is updated. When synchronization is needed, the data-synchronization engine 204 may retrieve from the version index a first version associated with one or more data entries in a graphical user interface and a second version associated with one or more data items in a data store 130 that correspond to the data entries. By comparing the first version and the second version, the data synchronization engine 204 may determine whether data in either the graphical user interface or the data store 130 has been changed and may make appropriate data updates accordingly.

In some embodiments, the event-monitoring engine 206 may be configured to monitor one or more events related to data updates or other data-mapping tasks. The data-mapping engine 118 may perform one or more tasks upon detection of triggering events. As an example, the data-mapping engine 118 may update a data entry in a spreadsheet only when a user opens up a graphical user interface showing the spreadsheet. To perform appropriate operations for this use case, the event-monitoring engine 206 may continuously monitor a plurality of events occurring at one or more network applications operating at the computing system 110 and determine whether any user accesses or views the data of interest. If so, the event-monitoring engine 206 may send a notification to one or more other sub-components of the data-mapping engine 118 (e.g., the data-synchronization engine 204) to trigger one or more operations of the sub-components (e.g., updating data entries in the graphical user interface). The event-monitoring engine 206 may actively monitor a plurality of events, such as user requests, user inputs, data changes, data synchronization failures, other suitable events, or any combination thereof. It may generate, log, and distribute one or more event reports based on the detected events.

In some embodiments, the data-dependency engine 208 may be configured to keep track of dependency relationships among data entries or data items. One or more first data items may be derived from or obtained by data transformations based on one or more second data items. In this case, the one or more first data items may depend on the one or more second data items. When the one or more second data items changes, the values of the first data items may be changed by virtue of their dependency on the second data items. The data-dependency engine 208 may maintain a dependency tree or graph describing dependency relationships among different data items. When an update is made to a data item, the data-dependency engine 208 may identify one or more other data items depending on the updated data item. The data-dependency engine 208 may send information associated with the identified dependency relationships to one or more other sub-components of the data-mapping engine 118 (e.g., the data-synchronization engine 204), which may update the dependent data items. Further details about the operation of the network environment 100, the computing system 110, and the data-mapping engine 118 are described by example of the methods illustrated in FIGS. 3A, 3B, 4, and 6.

Figure 3A:
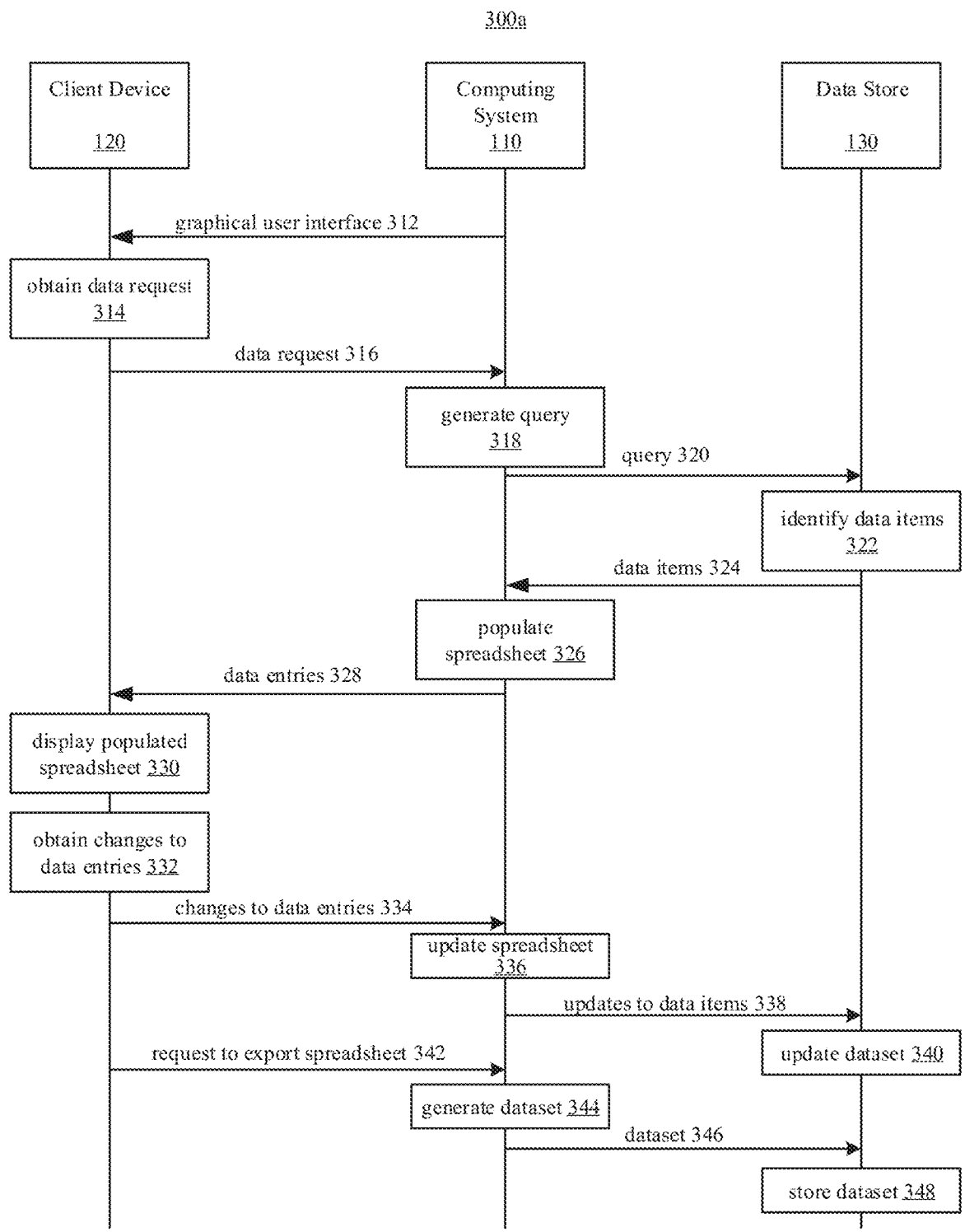
FIG. 3A illustrates an example method for updating data items in a data store based on data changes in a graphical user interface in accordance with some embodiments.

FIG. 3A illustrates an example method 300a for updating data items in a data store based on data changes in a graphical user interface in accordance with some embodiments. It should be appreciated that, unless otherwise stated, the method 300a can include additional, fewer, or alternative steps performed in similar, parallel, or alternative orders. The method 300a may start at step 312, in which the computing system 110 may provide a graphical user interface to a computing device 120 for display. The computing device 120 may be a client device associated with a user. In some embodiments, the graphical user interface may be a spreadsheet interface that comprises a spreadsheet with a plurality of cells containing data. In some embodiments, the graphical user interface may be provided by a network application running on the computing system 110. The network application may comprise an enhanced spreadsheet application configured to provide regular or enhanced spreadsheet functionalities, such as data presentation, data transformations, mathematical calculation, visualization, other suitable functionalities, or any combination thereof.

At step 314, the client device 120 may obtain a data request from the user. The user may have formulated the data request via one or more inputs in the graphical user interface displayed by the client device 120. For example, the user may formulate, in the graphical user interface, a search query including one or more keywords, one or more object types, one or more filters, one or more property types, one or more sorting criteria, one or more other suitable inputs, or any combination thereof. The search query may constitute the entirely or part of the data request. At step 316, the client device 120 may send the data request to the computing system 110. The data request may comprise the search query formulated based on inputs by the user. At step 318, the computing system 110 may generate a data query based on the received data request. As an example, the computing system 110 may retrieve a search query included in the data request. As another example, the computing system 110 may generate a data query compliant with one or more data retrieval interfaces or data servers associated with the data store 130 based on the data request received from the client device 120. At step 320, the computing system 110 may send the data query to the data store 130.

At step 322, the computing system 110 or the data store 130 may identify, from one or more datasets in the data store 130, a plurality of data items responsive to the query. The data items may comprise individual data values or objects that each represents one or more related data values. The information for each of the objects may comprise one or more object identifiers, one or more object properties, one or more related objects, other suitable information, or any combination thereof. At step 324, the data store 130 may return the identified data items to the computing system 110. Then, at step 326, the computing system 110 may populate a spreadsheet corresponding to the graphical user interface displayed at the client device 120. At step 328, the computing system 110 may send, to the client device 120, a plurality of data entries for display in a plurality of cells of the spreadsheet interface. The data entries may correspond to the identified data items in the data store 130. As an example, the computing system 110 may send, to the client device 120, an updated spreadsheet interface that may comprise the data entries for display. As another example, the computing system 110 may directly send the data entries to the client device 120. The client device 120 may display the data entries in appropriate cells in the spreadsheet interface.

At step 330, the client device 120 may provide for display the spreadsheet populated with the data entries in the graphical user interface or spreadsheet interface. The graphical user interface may allow the user to perform various actions such as data additions, modifications, or transformations. At step 332, the client device 120 may obtain one or more changes to one or more data entries displayed in the graphical user interface based on one or more user inputs. Then, at step 334, the client device 120 may send information associated with the one or more changes to the computing system 110. At step 336, the computing system 110 may update the spreadsheet based on the one or more changes. At step 338, the computing system 110 may transmit the updates to data items to the data store 130. At step 340, the computing system 110 or the data store 130 may update, in the data store 130 based on the one or more changes, one or more of the data items corresponding to the one or more changed data entries.

In some embodiments, data entries displayed in the graphical user interface may be exported to the data store 130. At step 342, the client device 120 may send a request to export data entries in a plurality of cells in a spreadsheet currently displayed in the graphical user interface. Then, at step 344, the computing system 110 may generate a data set comprising a plurality of data items corresponding to the data entries in the cells. As an example, the data items may be identical to the data entries in the spreadsheet. As another example, the data items may comprise one or more groupings of the data entries in the spreadsheet in a preset structure. The computing system 110 may transmit the dataset to the data store 130 at step 346, which may store the dataset at step 348. Here, the newly-created dataset may be distinguishable and independent from one or more datasets from which the data entries originally displayed in the spreadsheet interface were obtained.

Figure 3B:
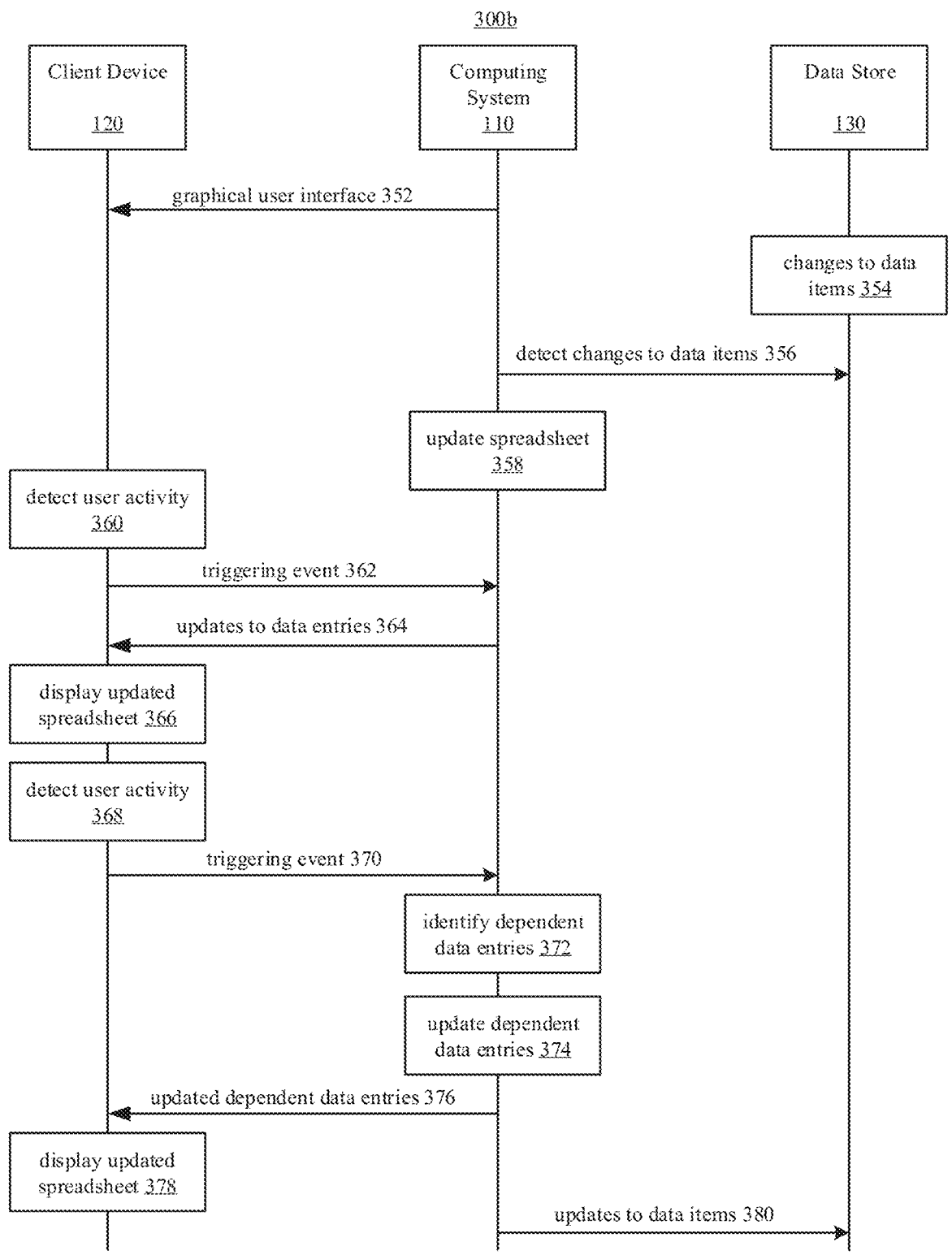
FIG. 3B illustrates an example method for updating data entries in a graphical user interface based on data changes in a data store in accordance with some embodiments.

FIG. 3B illustrates an example method 300*b* for updating data entries in a graphical user interface based on data changes in a data store in accordance with some embodiments. It should be appreciated that, unless otherwise stated, the method 300*b* can include additional, fewer, or alternative steps performed in similar, parallel, or alternative orders. The method 300*b* may start at step 352, in which the computing system 110 may provide a graphical user interface to a computing device 120 for display. In some embodiments, the graphical user interface may be a spreadsheet interface that comprises a plurality of cells containing a plurality of data entries. The data entries in the spreadsheet interface may correspond to a plurality of data items in one or more datasets stored in the data store 130. At step 354, one or more changes may occur to one or more data items in the data store 130. For example, the one or more changes may have occurred as a result of changes to one or more other data entries corresponding to the data items that are made in another spreadsheet displayed to another user. In some embodiments, the computing system 110 may monitor the data items corresponding to the data entries displayed in the spreadsheet interface in a continuous or intermittently manner. At step 356, the computing system 110 may detect one or more changes to one or more of the data items. In some embodiments, the computing system 110 may maintain one or more version indexes for tracking version information of data items. The computing system 110 may retrieve, from a version index associated with the identified data items, a first version identifier associated with the identified data items in the data store. The computing system 110 may also determine a second version identifier associated with the data entries in the graphical user interface. Then the computing system 110 may determine whether the second version identifier is the same as the first version identifier. If the second version identifier is different from the first version identifier, determine that the data items in the data store 130 or the data entries in the graphical user interface have been updated. If the comparison of the version identifiers indicates that the data items in the data store 130 have been updated, the computing system 110 may proceed to update one or more of the data entries in the graphical user interface that correspond to one or more changed data items. The process for updating the data entries in the graphical user interface is described in further details with respect to steps 360, 362, 364, and 366. If the comparison of the version identifiers indicates that the data entries in the graphical user interface have been updated, the computer system 110 may proceed to update one or more of the data items in the data store 130. The process for updating the data items in the data store 130 is described in further details with respect to FIG. 3A.

In some embodiments, the computing system 110 may maintain a data structure corresponding to the spreadsheet displayed in the graphical user interface. The computing system 110 may update such a data structure according to the detected changes to the data items at 358. In some embodiments, the computing system 110 may directly and immediately push the updates to the data items to the client device 120 for display. In other embodiments, the computing system 110 may update the spreadsheet displayed at the client device 120 only upon detection of a triggering event. This embodiment may serve to reduce the computational resources used for synchronizing the graphical user interface with the data store 130 by avoiding unnecessary computational tasks. At step 360, the client device 120 may detect one or more user activities with respect to the graphical user interface containing the data entries corresponding to the changed data items. One or more of the detected user activities may constitute a triggering event. Such user activities may comprise, for example, accessing the graphical user interface, refreshing the graphical user interface, other suitable activities, or any combination thereof. At step 362, the client device 120 may send information about the triggering event to the computing system 110. In response, the computing system 110 may push the updates to the data entries to the client device 120 at step 364. At step 366, the client device 120 may accordingly display the updated spreadsheet. If the computing system 110 is configured to directly and immediately push the updates to the client device 120, steps 360 and 362 may be omitted.

In some embodiments, the computing system 110 may update one or more data entries that are dependent on the changed data entries. In some embodiments, the computing system 110 may immediately update all data entries dependent on one or more changed data entries upon the occurrence of the changes. In other embodiments, the computing system 110 may delay updating the dependent data entries until the detection of certain triggering events. At step 368, the client device 120 may detect one or more user activities with respect to a plurality of graphical user interfaces that may contain data entries dependent on the changed data entries. One or more of the detected user activities may constitute a triggering event. Such user activities may comprise, for example, display of the graphical user interface on a client device 120, a user input for refreshing the graphical user interface, other suitable events, or any combination thereof. At step 370, the client device 120 may send information about the triggering event to the computing system 110.

At step 372, the computing system 110 may identify one or more data entries that depend on the one or more of the data entries corresponding to the one or more changed data items. In some embodiments, the computing system 110 may identify the dependent data entries based on a dependency graph. The dependency graph may comprise a plurality of data entries and a plurality of dependency relationships among the data entries. It may be updated each time a data entry is created, a data entry is deleted, or a new dependency relationship is established between two or more data entries. A first data entry may depend on a second data entry when the first data entry is derived based on one or more data transformations involving the second data entry. A dependency relationship between the first data entry and the second data entry may comprise identification information associated with the first and second data entries as well as information associated with the data transformations for deriving the first data entry based on the second data entry. The dependency graph may have a hierarchical structure, such as a tree structure. The computing system 110 may identify, in the dependency graph, one or more dependency relationships associated with the one or more changed data entries and identify one or more different data entries based on the one or more dependency relationships. Then, the computing system 110 may proceed to updating the one or more different data entries based on the changes in response to the detected triggering event.

At step 374, the computing system 110 may update the dependent data entries. At step 376, the computing system 110 may send the updated dependent data entries to the client device 120 displaying the dependent data entries. Then, at step 378, the client device 120 may provide the updated spreadsheet for display to the user. The updates to the dependent data entries may also be synchronized to the data store 130. For example, at step 380, the computing system 110 may send updates to data items corresponding to the updated dependent data entries to the data store 130. The data store 130 may update the data items accordingly.

Figure 4:
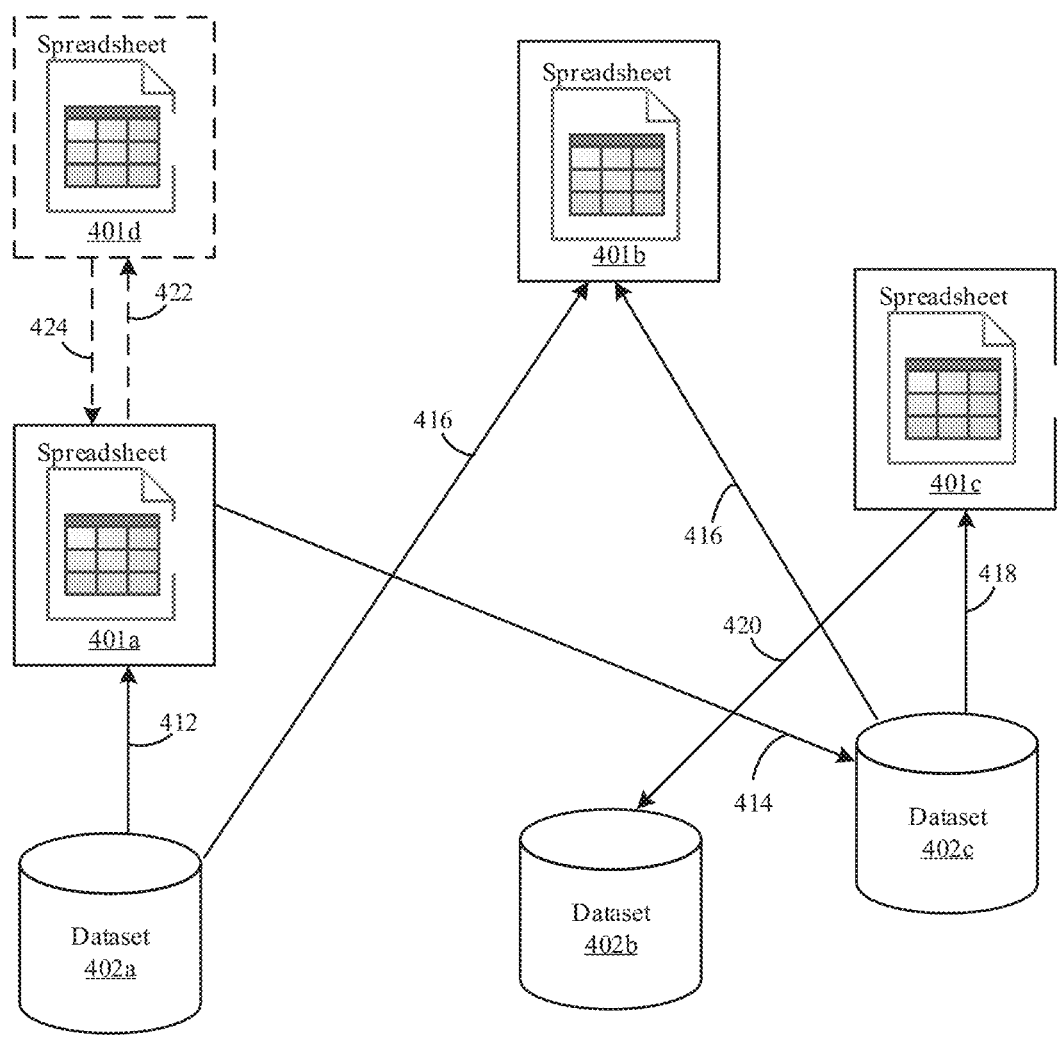
FIG. 4 illustrates a plurality of example interactions between one or more graphical user interfaces and one or more datasets in accordance with some embodiments.

FIG. 4 illustrates a plurality of example interactions between one or more graphical user interfaces and one or more datasets in accordance with some embodiments. In some embodiments, the systems and methods disclosed herein may enable collaboration among different users. FIG. 4 shows spreadsheet interfaces 401a-401d and datasets 402a-402c. In some embodiments, the spreadsheet interfaces 401a, 401b, and 401c may be provided for display on three different client devices 120 associated three users (i.e., a first user, a second user, a third user), respectively. The datasets 402a, 402b, and 402c may be stored in one or more data stores 130. The spreadsheet interfaces 401a-401d and the datasets 402a-402c may interact in various ways in the process of achieving various functionalities disclosed herein.

In some embodiments, a spreadsheet interface may import data from one or more datasets. For example, in interaction 412, the spreadsheet interface 401a may import data items from one or more datasets including the dataset 402a. The data items imported may have been found responsive to one or more data queries generated based on inputs of the first user, whose client device 120 displays the spreadsheet interface 401a. In some embodiments, edits to data entries displayed in a spreadsheet interface may be exported to another dataset. For example, in interaction 414, the data items edited in the spreadsheet interface 401a may be exported to dataset 402c. In some embodiments, changes to data items in datasets may be synchronized to interfaces displaying information associated with the data items. For example, in interaction 416, the one or more data items in the dataset 402c may be provided to the spreadsheet interface 401b, which may update one or more data entries displayed in the spreadsheet interface 401b corresponding to the edited data items. The spreadsheet interface 401b may also comprise data items from one or more other datasets, such as the dataset 402a. The spreadsheet interface 401b may be displayed by a client device 120 associated with the second user. In interaction 418, the spreadsheet interface 401c may import data items from the dataset 402c. In interaction 420, data items in the spreadsheet interface 401c may be stored in dataset 402b.

In some embodiments, an intermediate graphical user interface may be used for updating data in one or more spreadsheet interfaces or one or more datasets. The spreadsheet 401d may comprise such an intermediate interface and may be displayed by a client device associated with the first user, which also displays the spreadsheet interface 401a. In interaction 422, a plurality of data entries in the spreadsheet interface 401a may be mapped to the spreadsheet interface 401d. In the spreadsheet interface 401d, the first user may make one or more changes to the data entries. The computing system 110 or the client device 120 associated with the first user may store information associated with the one or more changes to the one or more of the data entries. The one or more changes may not be synchronized to the spreadsheet interface 401a unless a user confirmation is received. The computing system 110 or the client device 120 may receive a user input confirming the one or more changes. In response to this user input, in interaction 424, the one or more changes may be mapped to corresponding data entries in the spreadsheet interface 401a. Then, via one or more interactions similar to the interaction 414, the computing system 110 may update one or more data items in the dataset 402c accordingly.

Figure 5B:
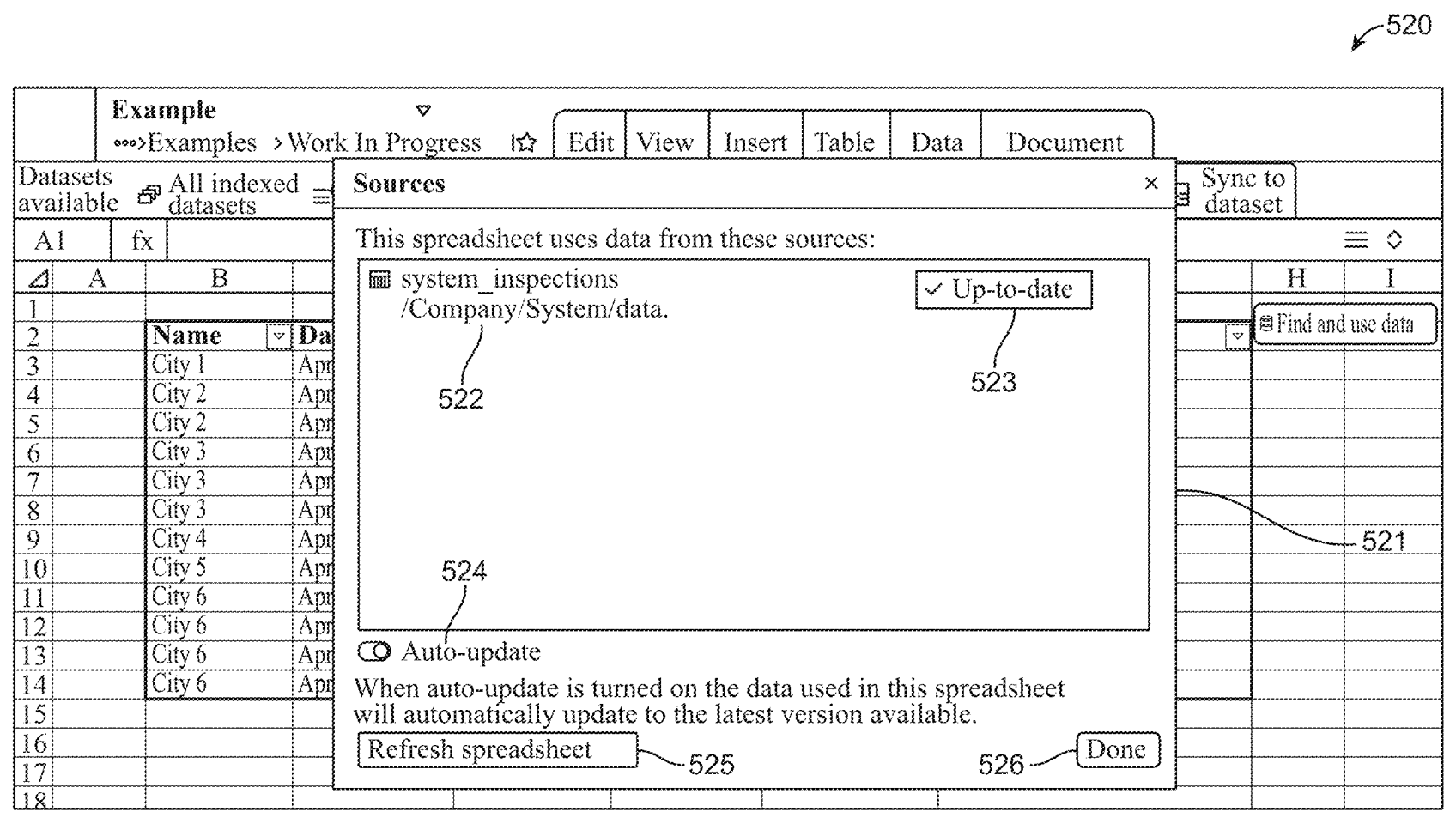

FIGS. 5A-5E illustrates a plurality of example graphical user interfaces each comprising one or more spreadsheets in accordance with some embodiments. The graphical user interfaces may be created and rendered by one or more network applications associated with the computing system 110 and displayed by the computing device 120. FIG. 5A illustrates an example spreadsheet interface 510 comprising a plurality of cells. The spreadsheet interface 510 may comprise a title of the spreadsheet 511 and a button 512 for importing data into the spreadsheet interface. A user may interact with the button 512 in order to query for data stored in one or more data stores 130 and import the data into the spreadsheet interface 510. The spreadsheet interface 510 further comprises a plurality of menu items 513, which may be interacted with to control one or more features associated with the spreadsheet interface 510 or to perform a plurality of data transformations on data entries displayed in the spreadsheet interface 510. The spreadsheet interface 510 may comprise a plurality of data entries 514 and 515. The data entries may be imported from one or more data stores 130 or may be newly added to the spreadsheet interface 510. For example, the data entries 514 may be imported from one or more data stores 130 and the data entries 515 may be newly added by a user. The spreadsheet interface 510 may further comprise a plurality of additional menu items. For example, the spreadsheet interface 510 may comprise a button 516 associated with one or more sources associated with the spreadsheet interface 510 and a button 517 associated with synchronizing data in the spreadsheet interface 510 with data in one or more datasets in one or more data stores 130.

FIG. 5B illustrates an example spreadsheet interface 520. The spreadsheet interface 520 may or may not be the same as the spreadsheet interface 510. If a user interacts with the button 516, as illustrated in FIG. 5A, the spreadsheet interface 520 may provide for display a pop-up window 521. The window 521 may comprise a list of sources from which the data entries in the spreadsheet interface 520 are from. For each source, the window 521 may comprise a directory or an address 522 and a synchronization status with respect to the source 523. For example, the synchronization status may indicate that the data entries displayed in the spreadsheet interface 520 are up to date or synchronized with the data items in the source. The window 521 may comprise an element 524 allowing a user to set automatic updating properties. If automatic update is enabled, the data entries in the spreadsheet interface 520 may automatically update to the latest version stored in the one or more sources. The window 521 may also comprise a button 525 for refreshing the data entries in the spreadsheet interface 520 and synchronizing them with corresponding data items in one or more data stores 130. The window 521 may further comprise a button 526, which, if interacted with, may close the window 521.

FIG. 5C illustrates an example spreadsheet interface 530. The spreadsheet interface 530 may or may not be the same as the spreadsheet interfaces 510 or 520. If a user interacts with the button 517, as illustrated in FIG. 5A, the spreadsheet interface 530 may provide for display a menu 531 configured to control one or more properties associated with synchronizing data entries in the spreadsheet interface 530 and data items in one or more datasets stored in one or more data stores 130. The menu 531 may comprise a directory 532 linking to a dataset to which the data entries in the spreadsheet interface 530 have been exported to and a field 533 for controlling a branch or version of the dataset to export data to. The menu 531 may also comprise a field 534 for controlling synchronization for each column of data entries in the spreadsheet interface 530. When the setting is automatic, changes to data entries in the corresponding column may be automatically synchronized to corresponding data items in the dataset.

FIG. 5D illustrates an example spreadsheet interface 540. The spreadsheet interface 540 may serve as an editor interface corresponding to one or more other spreadsheet interfaces. In some embodiments, the spreadsheet interface 540 may obtain a plurality of data entries 541 from one or more data stores 130 or one or more other spreadsheet interfaces (e.g., the spreadsheet interface 510). In the spreadsheet interface 540, a user may make one or more changes to the data entries 541. The spreadsheet interface 540 may comprise a column 542 showing status of changes of the data entries 541. For example, if a data entry in a particular row of the data entries 541 is changed, the data entry in the corresponding cells of the column 542 may be changed from "false" to "true." The spreadsheet interface 540 may comprise a button 543 allowing a user to submit changes made to the data entries 541. In some embodiments, the changes to the data entries 541 may be synchronized to the data stores 130 only upon user interaction with the button 543. The spreadsheet interface 540 may also comprise a button 544 allowing a user to reset the document and revert all the changes to the data entries 541.

Figure 5E:
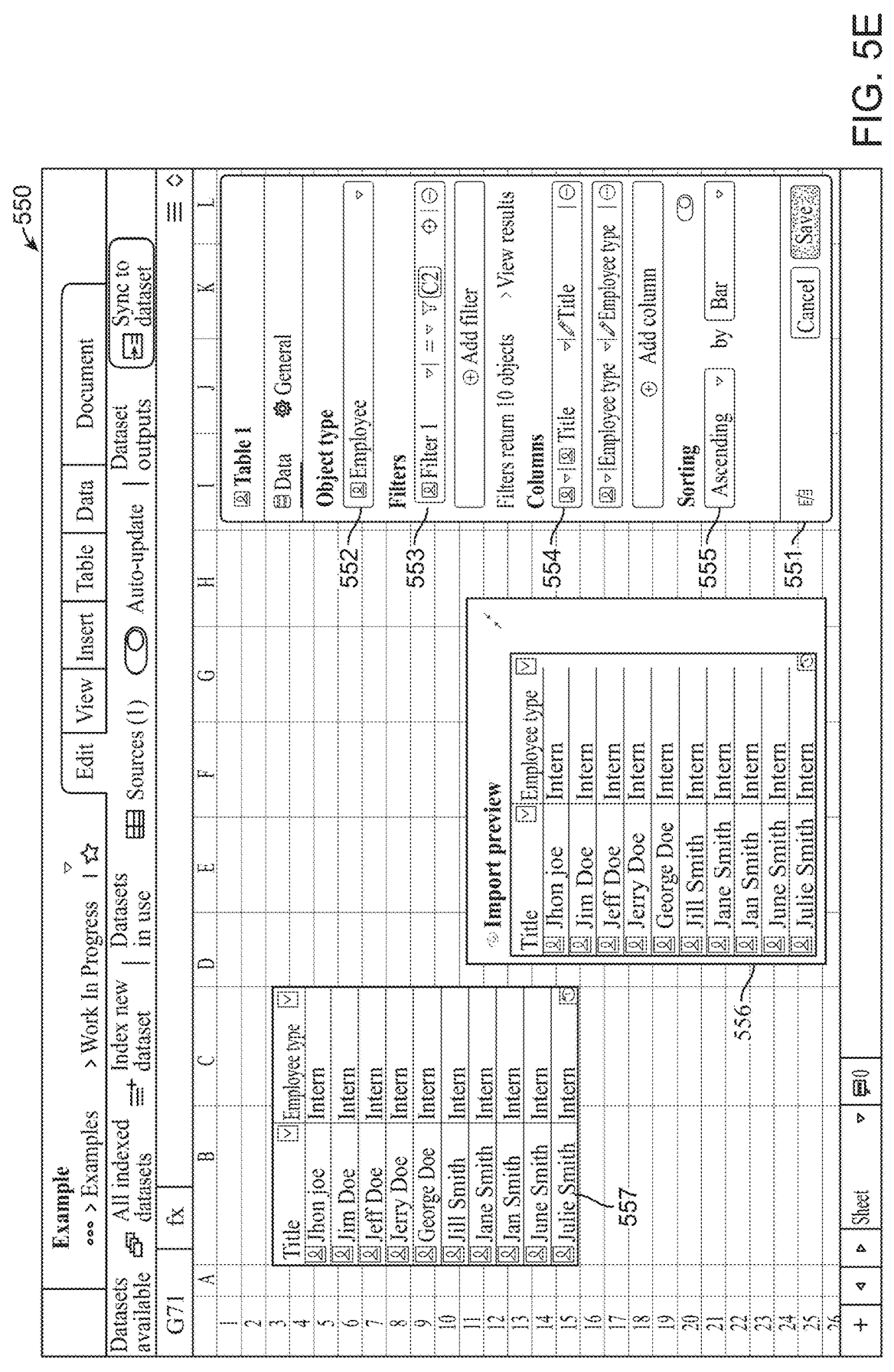

FIG. 5E illustrates an example spreadsheet interface 550. In some embodiments, a menu 551 may be displayed in the spreadsheet interface 550 if a user interacts with the button 512 illustrated in FIG. 5A. The menu 551 may allow the user to input various information for identifying data objects for importing into the spreadsheet interface 550. The menu 551 may comprise a field 552 for selecting an object type, a field 553 for adding one or more filters, a field 554 for choosing one or more columns (e.g., each corresponding to a property of the objects) for inclusion in the spreadsheet interface 550, a field 555 for adding one or more sorting criteria for the data objects, or other suitable menu items. In some embodiments, the spreadsheet interface 550 may display a preview window 556 showing a previous of the data objects identified based on the user's inputs. The data objects shown in the preview window 556 may change dynamically based on the user's inputs in the menu 551. This may allow the user to control the inputs in the menu 551 based on data objects shown in the preview window 556 in order to import desirable data. After the user confirms the inputs in the menu 551, the spreadsheet interface 550 may display a plurality of data entries responsive to the user's query in a field 557 that comprises a plurality of cells.

Figure 6:
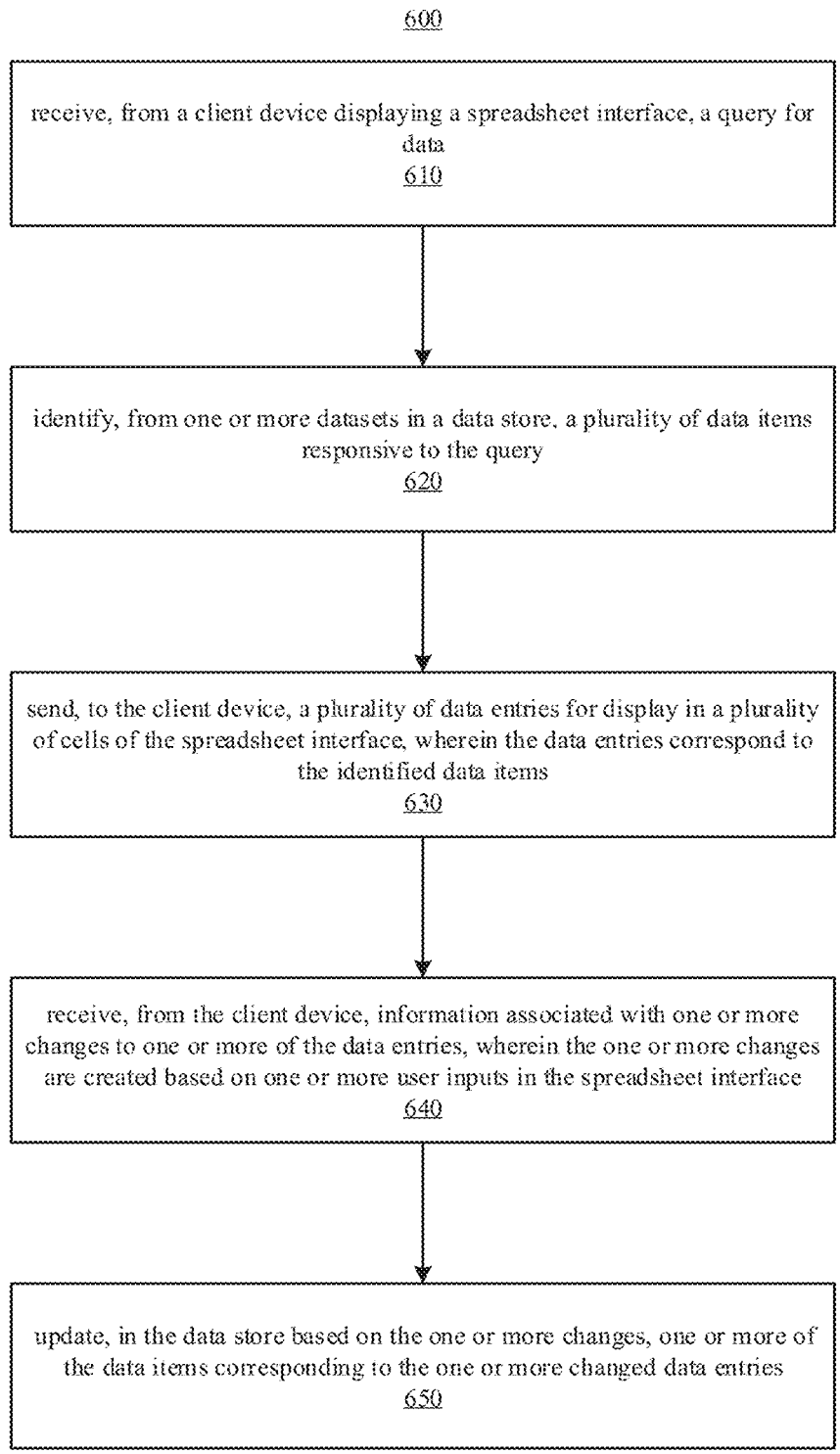
FIG. 6 illustrates an example method for synchronizing data between a spreadsheet interface and a data store in accordance with some embodiments.

FIG. 6 illustrates an example method 600 for synchronizing data between a spreadsheet interface and a data store in accordance with some embodiments. It should be appreciated that, unless otherwise stated, the method can include additional, fewer, or alternative steps performed in similar, parallel, or alternative orders.

At block 610, the example method 600 may receive, from a client device displaying a spreadsheet interface, a query for data. At block 620, the example method 600 may identify, from one or more datasets in a data store, a plurality of data items responsive to the query. At block 630, the example method 600 may send, to the client device, a plurality of data entries for display in a plurality of cells of the spreadsheet interface, wherein data entries correspond to the identified data items. At block 640, the example method 600 may receive, from the client device, information associated with one or more changes to one or more of the data entries, wherein the one or more changes are created based on one or more user inputs in the spreadsheet interface. At block 650, the example method 600 may update, in the data store based on the one or more changes, one or more of the data items corresponding to the one or more changed data entries.

Hardware Implementation

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 7:
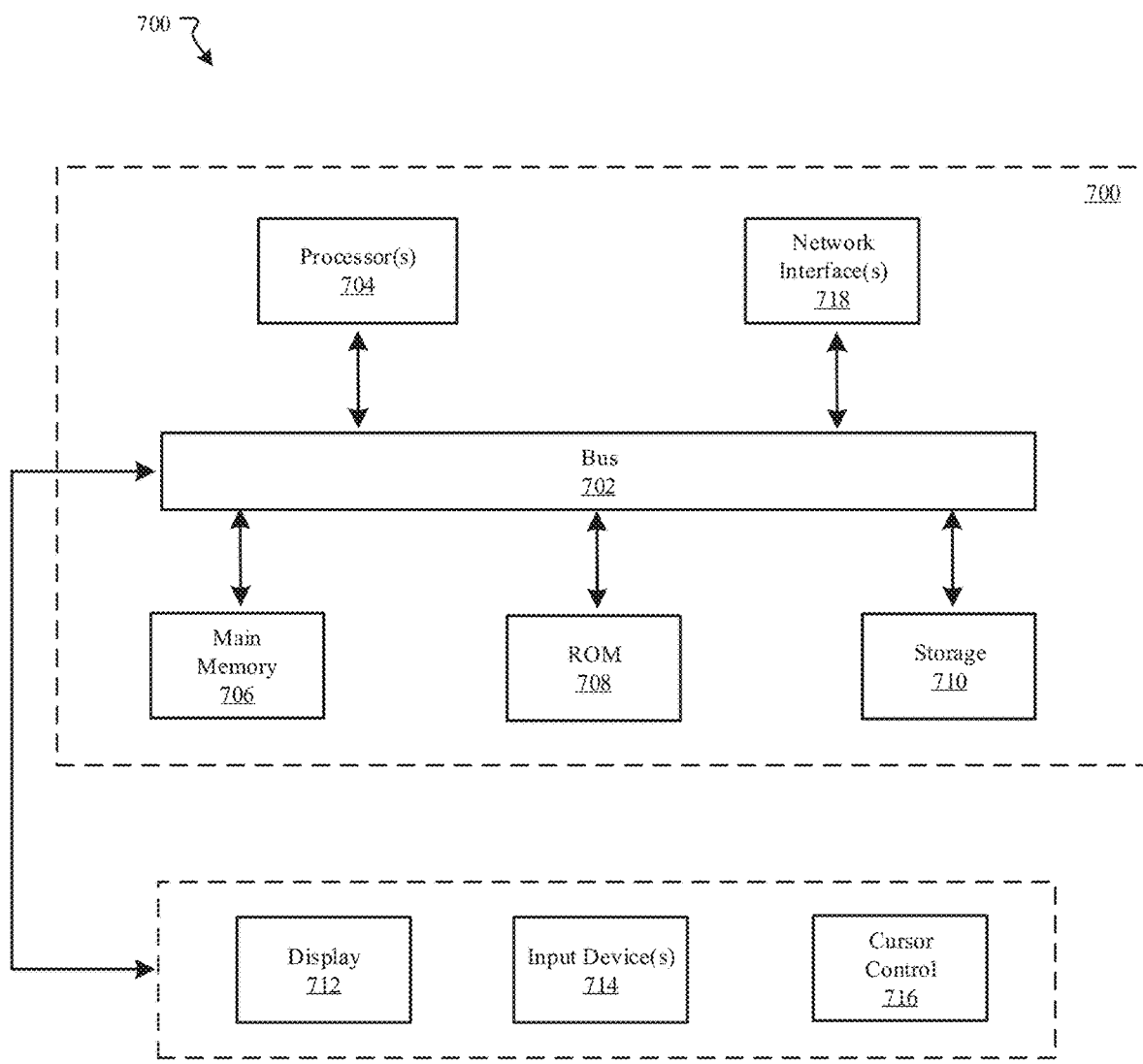
FIG. 7 illustrates an example computer system or computing device that can be used to implemented any of the embodiments disclosed herein.

FIG. 7 illustrates an example computer system or computing device 700 that can be used to implemented any of the embodiments disclosed herein. The computer system 700 includes a bus 702 or other communication mechanism for communicating information, one or more hardware processors 704 coupled with bus 702 for processing information. Hardware processor(s) 704 may be, for example, one or more general purpose microprocessors.

The computer system 700 also includes a main memory 706, such as a random access memory (RAM), cache and/or other dynamic storage devices, coupled to bus 702 for storing information and instructions to be executed by processor 704. Main memory 706 also may be used for storing temporary variables or other intermediate information during execution of instructions to be executed by processor 704. Such instructions, when stored in storage media accessible to processor 704, render computer system 700 into a special-purpose machine that is customized to perform the operations specified in the instructions.

The computer system 700 further includes a read only memory (ROM) 708 or other static storage device coupled to bus 702 for storing static information and instructions for processor 704. A storage device 710, such as a magnetic disk, optical disk, or USB thumb drive (Flash drive), etc., is provided and coupled to bus 702 for storing information and instructions.

The computer system 700 may be coupled via bus 702 to a display 712, such as a cathode ray tube (CRT) or LCD display (or touch screen), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

The computing system 700 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage.

The computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 710. Volatile media includes dynamic memory, such as main memory 706. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer may load the instructions into its dynamic memory and send the instructions over a telephone line using a modem. A modem local to computer system 700 may receive the data on the telephone line and use an infra-red transmitter to convert the data to an infra-red signal. An infra-red detector may receive the data carried in the infra-red signal and appropriate circuitry may place the data on bus 702. Bus 702 carries the data to main memory 706, from which processor 704 retrieves and executes the instructions. The instructions received by main memory 706 may retrieves and executes the instructions. The instructions received by main memory 706 may optionally be stored on storage device 710 either before or after execution by processor 704.

The computer system 700 also includes a communication interface 718 coupled to bus 702. Communication interface 718 provides a two-way data communication coupling to one or more network links that are connected to one or more local networks. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN (or WAN component to communicated with a WAN). Wireless links may also be implemented. In any such implementation, communication interface 718 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet". Local network and Internet both use electrical, electromagnetic or optical signals that carry digital data streams. The signals through the various networks and the signals on network link and through communication interface 718, which carry the digital data to and from computer system 700, are example forms of transmission media.

The computer system 700 may send messages and receive data, including program code, through the network(s), network link and communication interface 718. In the Internet example, a server might transmit a requested code for an application program through the Internet, the ISP, the local network and the communication interface 718.

The received code may be executed by processor 704 as it is received, and/or stored in storage device 710, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention may be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a stand-alone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines may provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Although the disclosure has been described in detail for the purpose of illustration based on what is currently considered to be the most practical and preferred implementations, it is to be understood that such detail is solely for that purpose and that the disclosure is not limited to the disclosed implementations. On the contrary, the disclosure is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

For purposes of explanation, numerous specific details are outlined to provide a thorough understanding of the description. It will be apparent, however, to one skilled in the art that embodiments of the disclosure can be practiced without these specific details. In some instances, modules, structures, processes, features, and devices are shown in block diagram form to avoid obscuring the description. In other instances, functional block diagrams and flow diagrams are shown to represent data and logic flows. The components of block diagrams and flow diagrams (e.g., modules, blocks, structures, devices, features, etc.) can be variously combined, separated, removed, reordered, and replaced in a manner other than as expressly described and depicted.

Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter of this application.

Additionally, boundaries between various resources, operations, engines, engines, and data stores are somewhat arbitrary, and particular operations are illustrated in a context of specific illustrative configurations. Other allocations of functionality are envisioned and can fall within a scope of various embodiments of the present disclosure. In general, structures and functionality presented as separate resources in the example configurations can be implemented as a combined structure or resource. Similarly, structures and functionality presented as a single resource can be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Specific methods, devices, and materials are described, although any methods and materials similar or equivalent to those described can be used in the practice or testing of the present embodiment. Unless defined otherwise, all technical and scientific terms used in this description have the same meanings as commonly understood by one of ordinary skill in the art to which this embodiment belongs.

The terms "a," "an," and "at least one" encompass one or more of the specified element. Thus, plural instances can be provided for resources, operations, or structures described in this application as a single instance. That is, if two of a particular element are present, one of these elements is also present and thus "an" element is present. The terms "a plurality of" and "plural" mean two or more of the specified element. The term "or" used between the last two of a list of elements means any one or more of the listed elements. For example, the phrase "A, B, or C" means "A, B, and/or C," which means "A," "B," "C," "A and B," "A and C," "B and C," or "A, B, and C."

Reference in this specification to "one embodiment," "an embodiment," "other embodiments," "one series of embodiments," "some embodiments," "various embodiments," or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether there is express reference to an "embodiment" or the like, various features are described, which can be variously combined and included in some embodiments, but also variously omitted in other embodiments. Similarly, various features are described that can be preferences or requirements for some embodiments, but not other embodiments.

Conditional language, such as, among others, "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements or steps are included or are to be performed in any particular embodiment.

It will be appreciated that an "engine," "system," "data store," or "database" can comprise software, hardware, firmware, or circuitry. In one example, one or more software programs comprising instructions capable of being executable by a processor can perform one or more of the functions of the engines, data stores, databases, or systems described in this application. In another example, circuitry can perform the same or similar functions. Alternative embodiments can comprise more, less, or functionally equivalent engines, systems, data stores, or databases, and still be within the scope of present embodiments. For example, the functionality of the various systems, engines, data stores, or databases can be combined or divided differently.

The data stores described in this application can be any suitable structure (e.g., an active database, a high-scale time series database, relational database, a self-referential database, a table, a matrix, an array, a flat file, a documented-oriented storage system, a non-relational No-SQL system, and the like), and can be cloud-based or otherwise.

Without further elaboration, it is believed that one skilled in the art, using the proceeding description, can make and use the present disclosure to the fullest extent. The disclosure has been described in detail with reference only to the presently preferred embodiments. Persons skilled in the art will appreciate that various modifications can be made without departing from the disclosure. Accordingly, the disclosure is defined only by the following claims, along with the full range of equivalents to which the claims are entitled.

The invention claimed is:

1. A system comprising:
one or more processors; and
a memory storing instructions that, when executed by the one or more processors, cause the system to perform operations comprising:
  receiving, from a first client device displaying a first spreadsheet interface, a query for data, by a data processing component;
  identifying, by the data processing component, from one or more datasets in a data store, a plurality of first data items responsive to the query;
  sending, by a data transfer component, to the first client device, a plurality of data entries for display in a plurality of cells of the first spreadsheet interface, wherein the data entries correspond to the identified data items;
  detecting, by a data monitoring component, an event associated with a first change to first data entries of the data entries made at the first client device;
  in response to detecting the event, receiving, by a data synchronization component, a notification of the event from the data monitoring component
  in response to receiving the notification of the event:
    retrieving, by the data synchronization component, from a version index associated with the identified data items, a first version identifier;
    determining, by the data synchronization component, a second version identifier associated with the first data entries, wherein the first change causes an update to the second version identifier; and detecting, by the data synchronization component, the first change based on a difference between the first version identifier and the second version identifier;

synchronizing, by the data synchronization component, the first change with a corresponding subset of the identified first data items in the data store;

in response to synchronizing the first change, updating, by the data synchronization component, the first version identifier;

generating, by the data transfer component, a new dataset comprising the changed first data entries;

transmitting, by the data transfer component, the new dataset to the data store receiving, from the data monitoring component, a second change, of one or more second data entries, from a second client device operating a second spreadsheet interface;

receiving, by the data synchronization component, a notification of the second change from the data monitoring component;

synchronizing, by the data synchronization component, the second change to one or more corresponding second data items in the data store;

modifying, by the data synchronization component, the updated first version identifier in response to synchronizing the second change of the data item;

comparing, by the data synchronization component, the modified and updated first version identifier to the updated second version identifier; and in response to detecting a difference between the modified and updated first version identifier and the updated second version identifier:
  updating, by the data synchronization component, a corresponding second data entry at the first spreadsheet interface upon detecting an access, by the first client device, at the corresponding second data entry; and
  updating, by the data synchronization component, the corresponding second data entry at a third spreadsheet interface operated by a third client device upon detecting an access, by the third client device, at the corresponding second data entry.

2. The system of claim 1, wherein the plurality of data items comprise information associated with a plurality of objects, the information for each of the objects comprising:
one or more object identifiers;
one or more object properties; or
one or more related objects.

3. The system of claim 2, wherein the query comprises:
one or more keywords;
one or more object types;
one or more filters;
one or more property types; or
one or more sorting criteria.

4. The system of claim 1, wherein the operations further comprise:
receiving, from the first client device, information associated with the first change to the first data entries, wherein the first change is created based on one or more user inputs in the first spreadsheet interface;
storing the information associated with the first change to the first data entries;
receiving a user input confirming the first change; and
updating the one or more of the first data items in response to the user input confirming the first change.

5. The system of claim 1, wherein the operations further comprise:
detecting a triggering event associated with the first spreadsheet interface;
identifying one or more different data entries in the first spreadsheet interface that depend on the one or more of the first data entries; and
updating, in response to the detecting the triggering event, the one or more different data entries.

6. The system of claim 5, wherein the triggering event comprises:
display of the first spreadsheet interface on the first client device; or
a user input for refreshing the first spreadsheet interface.

7. A computer-implemented method, implemented by a computing system, the method comprising:
receiving, from a first client device displaying a first spreadsheet interface, a query for data, by a data processing component;
identifying, by the data processing component, from one or more datasets in a data store, a plurality of first data items responsive to the query;
sending, by a data transfer component, to the first client device, a plurality of data entries for display in a plurality of cells of the first spreadsheet interface, wherein the data entries correspond to the identified data items;
detecting, by a data monitoring component, an event associated with a first change to first data entries of the data entries made at the first client device;
in response to detecting the event, receiving, by a data synchronization component, a notification of the event from the data monitoring component
in response to receiving the notification of the event:
  retrieving, by the data synchronization component, from a version index associated with the identified data items, a first version identifier;
  determining, by the data synchronization component, a second version identifier associated with the first data entries, wherein the first change causes an update to the second version identifier; and
  detecting, by the data synchronization component, the first change based on a difference between the first version identifier and the second version identifier;
synchronizing, by the data synchronization component, the first change with a corresponding subset of the identified first data items in the data store;
in response to synchronizing the first change, updating, by the data synchronization component, the first version identifier;
generating, by the data transfer component, a new dataset comprising the changed first data entries;
transmitting, by the data transfer component, the new dataset to the data store
receiving, from the data monitoring component, a second change, of one or more second data entries, from a second client device operating a second spreadsheet interface;
receiving, by the data synchronization component, a notification of the second change from the data monitoring component
synchronizing, by the data synchronization component, the second change to one or more corresponding second data items in the data store;

modifying, by the data synchronization component, the updated first version identifier in response to synchronizing the second change of the data item;

comparing, by the data synchronization component, the modified and updated first version identifier to the updated second version identifier; and in response to detecting a difference between the modified and updated first version identifier and the updated second version identifier:
- updating, by the data synchronization component, a corresponding second data entry at the first spreadsheet interface upon detecting an access, by the first client device, at the corresponding second data entry; and
- updating, by the data synchronization component, the corresponding second data entry at a third spreadsheet interface operated by a third client device upon detecting an access, by the third client device, at the corresponding second data entry.

8. The method of claim 7, wherein the plurality of data items comprise information associated with a plurality of objects, the information for each of the objects comprising:
one or more object identifiers;
one or more object properties; or
one or more related objects.

9. The method of claim 8, wherein the query comprises:
one or more keywords;
one or more object types;
one or more filters;
one or more property types; or
one or more sorting criteria.

10. The method of claim 7, further comprising:
detecting a triggering event associated with the first spreadsheet interface;
identifying one or more different data entries in the first spreadsheet interface that depend on the one or more of the first data entries; and
updating, in response to the detecting the triggering event, the one or more different data entries.

11. A non-transitory computer-readable storage medium including instructions that, when executed by at least one processor of a computing system cause the computing system to perform operations comprising:
receiving, from a first client device displaying a first spreadsheet interface, a query for data, by a data processing component;
identifying, by the data processing component, from one or more datasets in a data store, a plurality of first data items responsive to the query;
sending, by a data transfer component, to the first client device, a plurality of data entries for display in a plurality of cells of the first spreadsheet interface, wherein the data entries correspond to the identified data items;
detecting, by a data monitoring component, an event associated with a first change to first data entries of the data entries made at the first client device;
in response to detecting the event, receiving, by a data synchronization component, a notification of the event from the data monitoring component;
in response to receiving the notification of the event:
retrieving, by the data synchronization component, from a version index associated with the identified data items, a first version identifier;
determining, by the data synchronization component, a second version identifier associated with the first data entries, wherein the first change causes an update to the second version identifier; and
detecting, by the data synchronization component, the first change based on a difference between the first version identifier and the second version identifier;

synchronizing, by the data synchronization component, the first change with a corresponding subset of the identified first data items in the data store;

in response to synchronizing the first change, updating, by the data synchronization component, the first version identifier;

generating, by the data transfer component, a new dataset comprising the changed first data entries;

transmitting, by the data transfer component, the new dataset to the data store;

receiving, from the data monitoring component, a second change, of one or more second data entries, from a second client device operating a second spreadsheet interface;

receiving, by the data synchronization component, a notification of the second change from the data monitoring component synchronizing, by the data synchronization component, the second change to one or more corresponding second data items in the data store;

modifying, by the data synchronization component, the updated first version identifier in response to synchronizing the second change of the data item;

comparing, by the data synchronization component, the modified and updated first version identifier to the updated second version identifier; and in response to detecting a difference between the modified and updated first version identifier and the updated second version identifier:
- updating, by the data synchronization component, a corresponding second data entry at the first spreadsheet interface upon detecting an access, by the first client device, at the corresponding second data entry; and
- updating, by the data synchronization component, the corresponding second data entry at a third spreadsheet interface operated by a third client device upon detecting an access, by the third client device, at the corresponding second data entry.

12. The system of claim 1, wherein the instructions further cause the one or more processors to perform:
rendering a first window within the spreadsheet interface, the first window comprising:
a first button that, upon selection, causes synchronization of the data entries with corresponding data items in the data store, and generates a second window that populates a directory linking to a dataset to which the data entries are synchronized and a field indicating a branch of version of the dataset;
a second button that, upon selection, generates a third window, the third window populating a listing of sources from which the data entries in the spreadsheet interface originate, and the directory;
synchronization statuses of the sources indicating whether the data entries in the spreadsheet interface are synchronized with the data items; and
a third button that, upon selection, generates a fourth window, a fifth window, and a sixth window, the fourth window populating a field to receive criteria comprising a selection or an input of an object type, one or more filters, one or more columns, and one or more sorting criteria, the fifth window populating a preview of data objects that changes dynamically based on the criteria, and the sixth window populating the data objects upon confirmation of the criteria, wherein the sixth window is located closest to a first row and a first column of the first window within the spreadsheet interface, compared to the fourth window and the fifth window.

13. The system of claim 1, wherein the instructions further cause the one or more processors to perform:
rendering an intermediate interface to receive a commitment to a change.

14. The system of claim 1, wherein the instructions further cause the system to perform:
determining dependent data entries with respect to the first data entries based on a hierarchical structure, wherein the hierarchical structure comprises information regarding dependency relationships among the data entries and information associated with transformations to derive the dependent data entries;
delaying computing of updates to the dependent data entries resulting from the changes to the first data entries until detecting of an access to a portion of the spreadsheet interface corresponding to the dependent data entries, wherein the access is by the client device;
detecting the access to the dependent data entries; and
in response to detecting the access:
computing the updates to the dependent data entries resulting from the changes to the first data entries; and
in response to computing the updates to the dependent data entries, synchronizing, in the data store, the updates to dependent data items corresponding to the dependent data entries.

* * * * *